United States Patent
Bevers

[11] Patent Number: 5,738,905
[45] Date of Patent: Apr. 14, 1998

[54] PROCESS FOR THE PRODUCTION OF A COMPOSITE COMPRISING ELECTRODE MATERIAL, CATALYST MATERIAL AND A SOLID-ELECTROLYTE MEMBRANE

[75] Inventor: Dirk Bevers, Boeblingen, Germany

[73] Assignee: Deutsche Forschungsanstalt fuer Luft- und Raumfahrt e.V., Bonn, Germany

[21] Appl. No.: 616,729

[22] Filed: Mar. 15, 1996

[30] Foreign Application Priority Data

Mar. 17, 1995 [DE] Germany ............... 195 09 748.3

[51] Int. Cl.[6] .................. B05D 1/36; B05D 3/02; B05D 3/00; H01M 4/86
[52] U.S. Cl. .......... 427/115; 427/201; 427/375; 427/553; 427/557; 427/559; 427/595; 429/218; 429/40; 429/42
[58] Field of Search ................ 427/115, 482, 427/553, 557, 559, 595, 201, 375; 429/218, 40, 42

[56] References Cited

U.S. PATENT DOCUMENTS

| | | | |
|---|---|---|---|
| 4,313,972 | 2/1982 | Groller et al. | 427/113 |
| 4,876,115 | 10/1989 | Raistrick | 427/115 |
| 4,988,582 | 1/1991 | Dyer | 429/30 |
| 5,076,898 | 12/1991 | Nidola et al. | 204/128 |
| 5,186,877 | 2/1993 | Watanabe | 264/104 |
| 5,234,777 | 8/1993 | Wilson | 429/33 |
| 5,314,760 | 5/1994 | Tsou et al. | 429/12 |
| 5,415,888 | 5/1995 | Banerjee et al. | 427/125 |

FOREIGN PATENT DOCUMENTS

| | | |
|---|---|---|
| 29 25 349 | 1/1980 | Germany. |
| 33 32 566 | 3/1985 | Germany. |
| 42 41 150 | 6/1994 | Germany. |
| 44 19 383 | 3/1995 | Germany. |

*Primary Examiner*—Shrive Beck
*Assistant Examiner*—Michael Barr
*Attorney, Agent, or Firm*—Barry R. Lipsitz

[57] ABSTRACT

In order to improve a process for the production of a composite consisting of electrode material, catalyst material and a solid-electrolyte membrane for an electrochemical cell, in particular a fuel cell, with which solid-electrolyte material is brought into pore-deep contact with the electrode material and the catalyst material by softening it, such that this can be carried out as effectively and inexpensively as possible, it is suggested that a catalytic powder comprising electrode material, catalyst material and solid-electrolyte material be produced, that the catalytic powder be arranged on a surface area, that the catalytic powder be heated on a side facing away from the surface area in order to soften the solid-electrolyte material and that subsequently the catalytic powder be applied to the solid-electrolyte membrane under pressure with the side facing away from the surface area while the solid-electrolyte material is still softened in order to form a composite.

17 Claims, 5 Drawing Sheets

PROCESS FOR THE PRODUCTION OF A COMPOSITE COMPRISING ELECTRODE MATERIAL, CATALYST MATERIAL AND A SOLID-ELECTROLYTE MEMBRANE

BACKGROUND OF THE INVENTION

The invention relates to a process for the production of a composite consisting of electrode material, catalyst material and a solid-electrolyte membrane for an electrochemical cell, in particular a fuel cell, with which solid-electrolyte material is brought into pore-deep contact with the electrode material and the catalyst material by softening it.

A process of this type is known, for example, from DE-PS 42 41 150. In the process described in this publication, solid-electrolyte material is, on the one hand, applied when dissolved in solvent and, on the other hand, the entire unit consisting of electrode material, catalyst material and solid-electrolyte membrane is then hot-pressed while it is being heated.

The disadvantage of this known solution is to be seen in the fact that the hot-pressing of the entire unit consisting of electrode material, catalyst material and solid-electrolyte membrane results in a considerable mechanical and thermal burden on the materials and, in addition, requires heating times which make an expensive process control necessary.

The object underlying the invention is therefore to improve a process of the generic type such that this can be carried out as effectively and inexpensively as possible.

SUMMARY OF THE INVENTION

This object is accomplished in accordance with the invention, in a process of the type described at the outset, in that a catalytic powder comprising electrode material, catalyst material and solid-electrolyte material is produced, that the catalytic powder is arranged on a surface area, that the catalytic powder is heated on a side facing away from the surface area in order to soften the solid-electrolyte material and that subsequently the catalytic powder is applied to the solid-electrolyte membrane under pressure with the side facing away from the surface area while the solid-electrolyte material is still softened in order to form a composite.

The advantage of the inventive solution is to be seen in the fact that, on the one hand, the catalytic powder can be applied to the surface area very easily and, on the other hand, due to the selective softening of the solid-electrolyte material contained in the catalytic powder it is possible to heat only the particles contributing to the formation of the composite. This means that due to the application of the catalytic powder with the solid-electrolyte material which is still softened to the solid-electrolyte membrane under pressure the formation of the composite between electrode material, catalyst material and solid-electrolyte membrane is carried out in a simple manner and selectively, using the softened solid-electrolyte material of the catalytic powder.

This has, in addition, the advantage that only a low amount of energy is required since only a selective local heating is carried out in the volume area of the composite formation and so a fast and, therefore, efficient and inexpensive procedure is possible.

The energy used for heating could, from a purely theoretical point of view, be introduced into the catalytic powder as a whole or partially by mechanical or thermal contact, i.e. via heat conduction or contact with a hot gas.

It is, however, far more advantageous, especially in order to introduce this energy as quickly as possible into the catalytic powder, when the catalytic powder is heated by electromagnetic radiation.

The electromagnetic radiation can be of the most varied kind. For example, it would be conceivable to use a laser as radiation source.

For reasons of simplicity, it is, however, particularly advantageous when the electromagnetic radiation is infrared radiation, in particular heat radiation of a heated body.

Particularly when it is necessary to make large quantities of softened solid-electrolyte material available or when there is the risk of the solid-electrolyte material of the catalytic layer hardening too quickly when applied to the solid-electrolyte membrane, it is advantageous when the solid-electrolyte material of the solid-electrolyte membrane is also heated prior to the application of the catalytic powder.

Furthermore, it would, in principle, be conceivable to introduce during the process, in addition, solid-electrolyte material which is dissolved in a solvent. It is, however, particularly advantageous when the inventive process is carried out exclusively free of solvent with respect to the supply of solid-electrolyte material.

In principle, it is conceivable to apply the catalytic powder to the solid-electrolyte membrane such that it is distributed over the entire membrane.

However, an areal application of the catalytic powder is preferably carried out in a surface region with a defined outer contour so that the process can be carried out with as little catalytic powder as possible.

It is even more advantageous, especially since free edge regions not covered by catalytic powder are desired in the inventive composite, when the catalytic powder is applied to the solid-electrolyte membrane in a surface region with a defined outer contour, leaving free edge regions on the solid-electrolyte membrane, so that the catalytic powder is applied, in particular, only in that region, in which the formation of a catalytic layer on the solid-electrolyte membrane is required and desired.

Such an application of the catalytic powder to the surface area, which is defined with respect to the shape, is possible in the most varied of ways. For example, it would be possible to design the surface area for the catalytic powder so as to be adhesive, this having the disadvantage that some of the catalytic powder always remains adhered to this surface area.

It is, therefore, particularly advantageous, especially in order to be able to carry out a production process as efficiently as possible, when the catalytic powder is fixed on the surface area by electrostatically charging this surface area.

A particularly expedient possibility is the analogous use of the conventional, known dry copying processes.

In order to create an electrode located on the solid-electrolyte membrane, it has proven to be particularly expedient when an electrically conductive catalytic layer is produced from the catalytic powder by means of mechanical compacting so that the catalytic layer itself can form the electrode.

The formation of the electrode from the catalytic layer on the solid-electrolyte membrane could preferably be carried out, on the one hand, by means of the described application of the catalytic powder and, on the other hand, by adding conductive material and/or binding agent where required.

It is, however, particularly advantageous when the formation of the electrode from the catalytic layer on the solid-electrolyte membrane is carried out merely by mechanically pressing the catalytic powder during the application of the powder to the solid-electrolyte membrane. This has the great advantage that a simple and inexpensive process control is thereby possible.

Within the scope of the inventive solution it is, in principle, conceivable to apply a single catalytic layer to the solid-electrolyte membrane in a single operation. It is, however, particularly advantageous within the scope of the inventive process when several catalytic layers are applied to the solid-electrolyte membrane one on top of the other. This process allows, in particular, the individual catalytic layers to be selected so as to be very thin and to be designed selectively with respect to their properties.

It is possible, in particular, within the scope of this solution to vary the degree of softening of the solid-electrolyte material during the application of the individual catalytic layers. This means that, for example, a high degree of softening of the solid-electrolyte material of the catalytic powder is given in the case of the catalytic layer located directly on the solid-electrolyte membrane in order to attain as intimate a composite as possible between solid-electrolyte membrane, solid-electrolyte material and the remaining components of the catalytic powder whereas in the case of the catalytic layers subsequently placed one on top of the other, for example, the degree of softening of the solid-electrolyte material decreases and, therefore, the uppermost catalytic layer is, for example, intimately joined to the catalytic layer located below it only by way of the mechanical pressing.

An additional advantage of the above-mentioned application of several catalytic layers is to be seen in the fact that their interconnection can be varied.

In order to make an advantageous contacting of the produced composite possible, it is preferably provided for a diffusion layer to be applied to the catalytic layer or the catalytic layers on their side facing away from the solid-electrolyte membrane.

The connection between the diffusion layer and the catalytic layer can, in principle, be brought about in any optional manner. A process which is particularly easy to carry out from a technical point of view provides for the diffusion layer to be joined to the catalytic layer exclusively by means of mechanical pressure.

This diffusion layer preferably consists of a material which allows a diffusion of the reaction components, preferably a material which allows an easy diffusion of gaseous reaction components.

In a most simple embodiment of an inventive process it is provided for the composite consisting of electrode material, catalyst material and solid-electrolyte membrane to be produced on one side of the solid-electrolyte membrane.

It is, however, even more advantageous when an inventive composite is produced on both sides of the solid-electrolyte membrane so that this forms an electrochemical unit and, as such, can be inserted into an inventive electrochemical cell and merely needs to be contacted in this cell.

For example, it is conceivable to carry out the coating of the solid-electrolyte membrane on both sides either simultaneously or consecutively.

Within the scope of the preceding description of the inventive process no details have been given as to the intended composition of the electrode material of the catalytic layer.

The electrode material of the catalytic layer is preferably carbon powder with a grain size in the range of between approximately 0.03 and approximately 1 μm.

The powdery catalyst material is preferably platinum powder with a grain size of between approximately 20 and approximately 50 Angstrom units.

In this respect, it is particularly expedient when the catalyst material is fixed on the powdery electrode material. For example, platinized carbon powder is used in accordance with the invention.

The solid-electrolyte material used in the catalytic powder is preferably identical to the solid-electrolyte material of the solid-electrolyte membrane and is present with a grain size of between approximately 0.5 and approximately 2 μm. One example of an inventive solid-electrolyte material is Nafion.

In addition, it is preferably provided for the catalytic powder to comprise a hydrophobing agent, for example PTFE (polytetrafluoroethylene), with a grain size of approximately 0.2 to approximately 1 μm. PTFE also acting at the same time as binding agent during the production of the catalytic layer by means of pressing due to its plasticity.

Furthermore, it is possible to add a pore-forming agent, for example, sugar to the catalytic powder, as well.

A particularly advantageous composition of the inventive catalytic powder provides, for example, for a proportion of approximately 50% of carbon, approximately 5% of platinum, approximately 20% of PTFE and approximately 25% of Nafion.

Additional features and advantages of the inventive solution are the subject matter of the following description as well as of the drawings of individual embodiments.

DETAILED DESCRIPTION OF THE INVENTION

Figure 1:
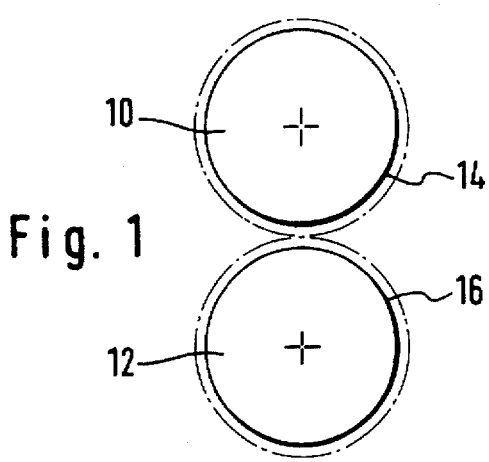
FIG. 1 is a schematic illustration of the copier drums used in the inventive process in the charged initial state.
Figure 2A:
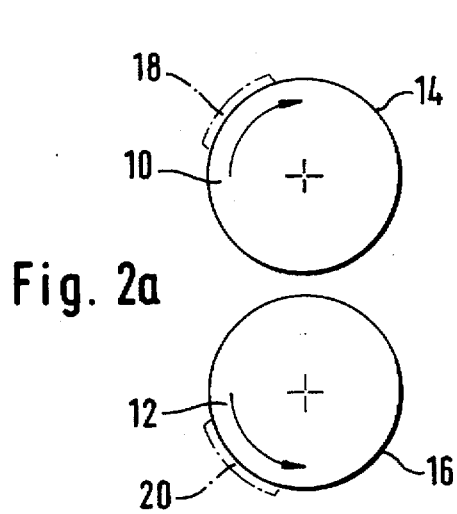
FIG. 2 is a schematic illustration of a determination of surface regions to be coated with catalytic powder by partial discharge in a side view (FIG. 2a) and plan view (FIG. 2b)
Figure 2B:
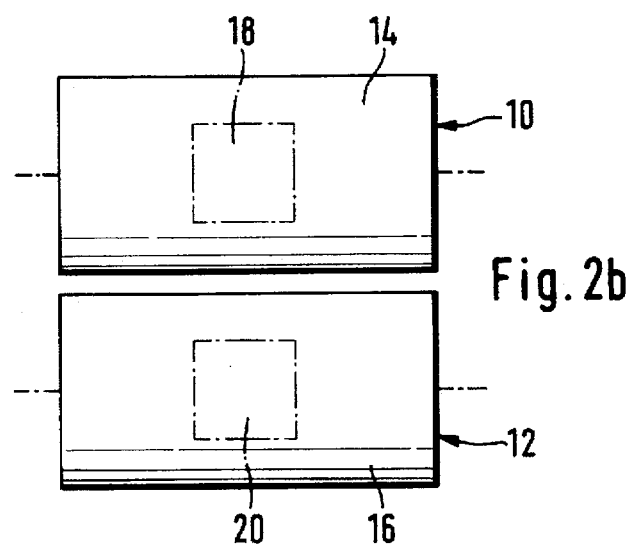
Figure 3A:
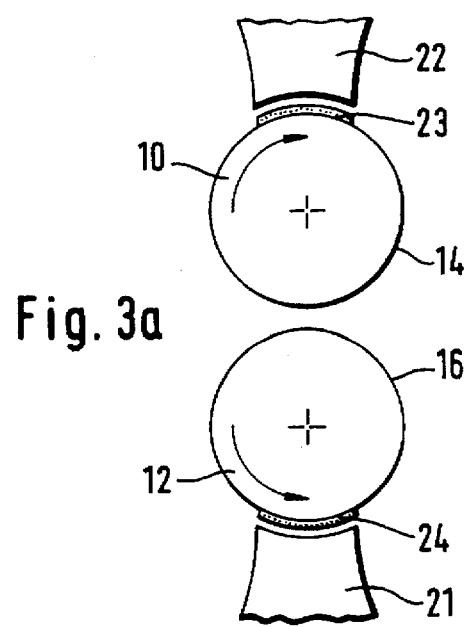
FIG. 3 is a schematic illustration of an application of catalytic powder to the surface regions defined in accordance with FIG. 2 in a side view (FIG. 3a) and plan view (FIG. 3b)

In the inventive process, two copier drums 10 and 12 are, as illustrated in FIGS. 1 to 3, electrostatically charged on their surfaces 14 and 16, respectively (FIG. 1), then partially discharged, for example, corresponding to the shape predetermined by a stencil or model so that surface regions 18 and 20, respectively, which are defined with respect to their shape and size are still electrically charged on the respective surfaces 14 and 16 of the copier drums 10 and 12.

Catalytic powder fed by supply means 21 and 22, respectively, is fixed on these respective electrostatically charged surface regions 18 and 20 in accordance with the processes used in copying technology so that surface areas 23 and 24 which are coated with catalytic powder and correspond in size and shape to the surface regions 18 and 20 result on the surfaces 14 and 16 of the copier drums.

The catalytic powder used is mixed, in accordance with the invention, in a premixing device, for example a blade mill, whereby the catalytic powder comprises in an inventive manner a mixture consisting of an electrically conductive material, for example carbon, a catalyst applied to the carbon, for example platinum, a hydrophobing agent, for example PTFE, and a solid-electrolyte material, for example Nafion (Nafion is a registered trademark of Du Pont). Where required, a pore-forming agent, for example sugar, can be added.

The composition of the catalytic powder amounts to, for example, approximately 50 percent by weight of carbon with a particle size of between approximately 0.03 and approximately 1 μm, preferably approximately 30 nm, approximately 5 percent by weight of platinum with a particle size of between approximately 20 and approximately 50 Angstrom units, preferably approximately 30 Angstrom units, these particles being applied to the carbon particles, for example, by a wet chemical process, approximately 20% of PTFE with a particle size of between approximately 0.1 and approximately 1 μm, preferably approximately 0.5 μm, and approximately 25% of Nafion with a particle size of between approximately 0.5 and approximately 2 μm, preferably approximately 1 μm.

Figure 3B:
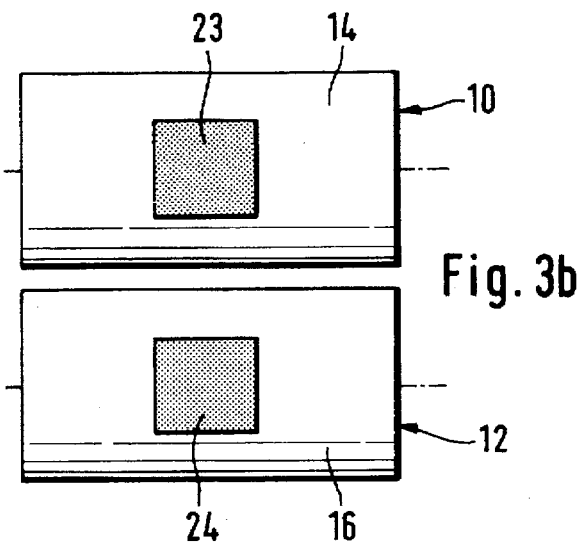
Figure 4:
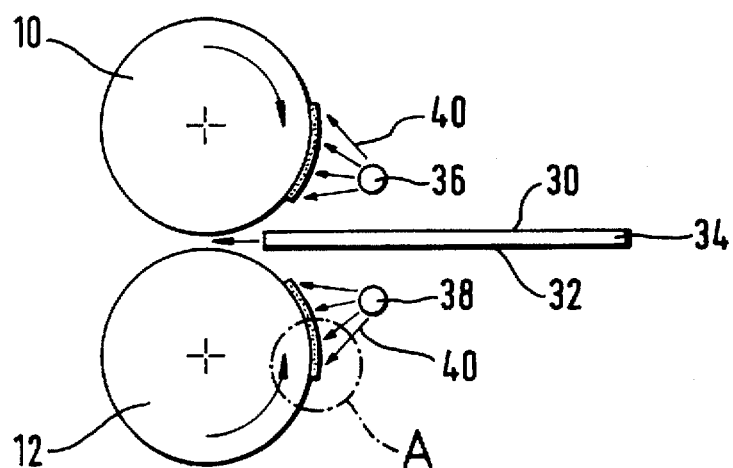
FIG. 4 is a schematic side view of the application of the catalytic powder to a solid-electrolyte membrane.

The catalytic powder applied to the surface areas 23 and 24 and illustrated in FIG. 3b is now applied, as illustrated in FIG. 4, by means of the two copier drums 10 and 12 to oppositely located surfaces 30 and 32 of a membrane consisting of solid-electrolyte material and designated as a whole as 34. The membrane 34 is conveyed between the two copier drums 10 and 12 and the copier drums thereby press the catalytic powder adhering to the surface areas 23 and 24 to the two surfaces 30 and 32 facing them.

Figure 5:
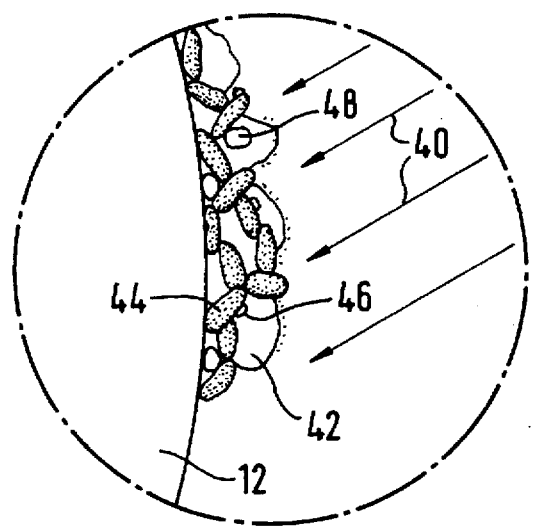
FIG. 5 is an enlarged section of an area A in FIG. 4.
Figure 6:
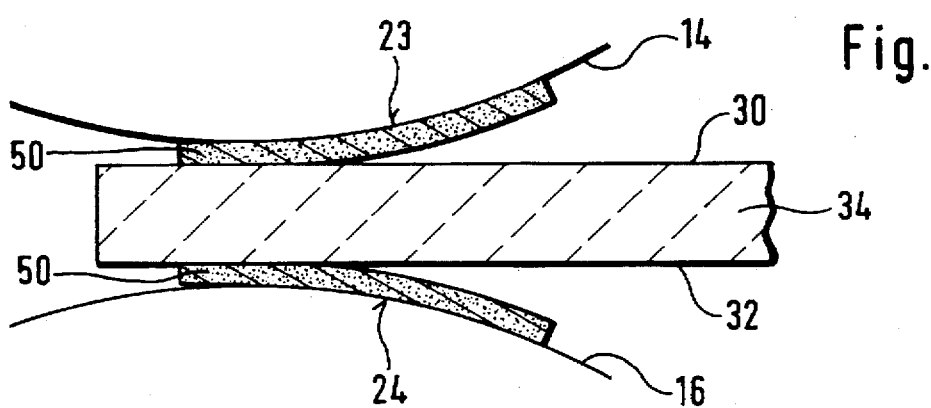
FIG. 6 is an enlarged illustration of the catalytic powder being pressed directly onto the membrane.

Before the catalytic powder is pressed onto the surfaces 30 and 32, respectively, this is heated by means of heat sources 36 and 38 providing infrared radiation 40, for example heated filaments. As illustrated in FIG. 5, particles 42 of the solid-electrolyte material contained in the catalytic powder start to melt or are melted so that after they are pressed onto the surfaces 30 and 32 of the membrane 34 an intimate connection results between the membrane likewise produced from the solid-electrolyte material and the solid-electrolyte particles 42 and, moreover, spaces between the particles 44 of the carbon as well as the particles 46 of the platinum and the particles 48 of the hydrophobing material are filled by softened solid-electrolyte material at least in regions bordering directly on the respective surface 30 or 32 of the membrane 34. This means that a three-dimensional three-phase boundary results between the solid electrolyte transporting ions, the catalyst and the electrode material with advantageous properties.

The solid-electrolyte particles 42 are preferably heated to a temperature which corresponds to their glass transition temperature. With the example of Nafion 117 as solid-electrolyte material, this is at approximately 135° C.

By adjusting the rotational speed of the copier drums 10 and 12 and the temperature of the heat sources 36 and 38, the melting depth of the catalyst material 26 on the surface areas 23 and 24, i.e. the depth, to which the particles 42 of the solid-electrolyte material melt or start to melt, can be adjusted.

Furthermore, it is also possible, depending on the design and arrangement of the heat sources 36, 38, either to heat up or likewise to soften the solid-electrolyte membrane 34 prior to the application of the catalytic powder.

The membrane 34 is preferably in a moist state during the application of the catalytic powder 26 to its surfaces 30 and 32; it is, however, also possible to supply the membrane 34 in a dry state.

Figure 7:
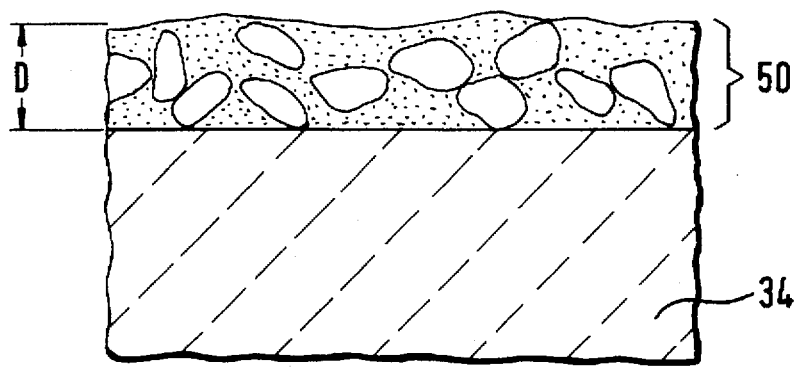
FIG. 7 is an enlarged illustration of a section of a piece of membrane with a catalytic layer arranged thereon in accordance with a first embodiment.

With the inventive process, an electrically conductive catalytic layer 50 which is generated from the catalytic powder due to the pressure of the copier drums 10 and 12 and has a thickness D in the range of approximately 1 μm to approximately 4 μm is applied to the membrane 34 during one pass according to FIGS. 1 to 6, as illustrated again on an enlarged scale in FIG. 7.

Figure 8:
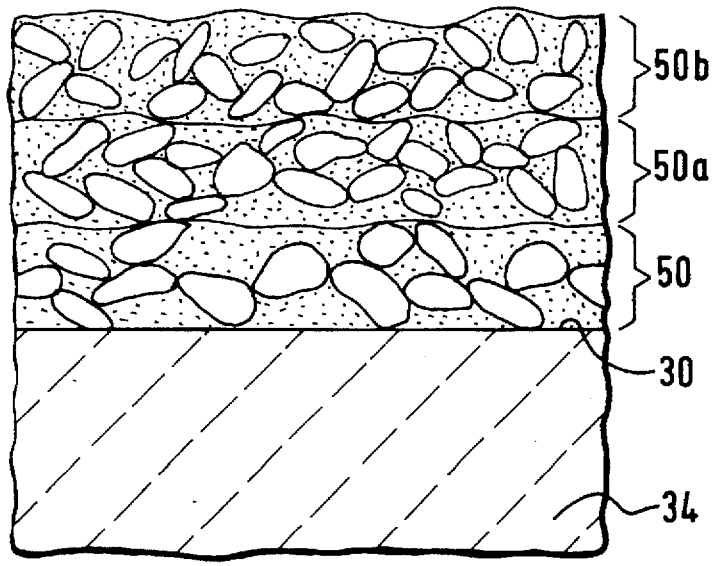
FIG. 8 is a schematic illustration of a piece of membrane with several catalytic layers in accordance with a second embodiment.
Figure 9:
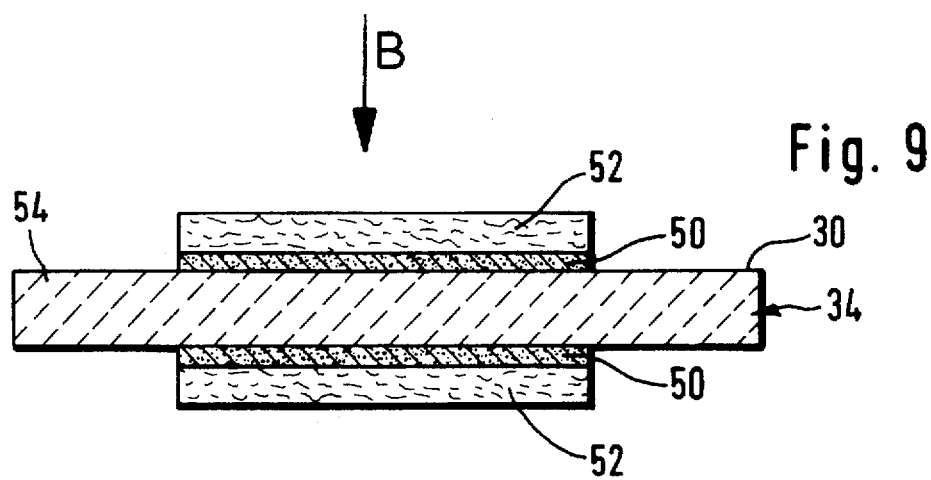
FIG. 9 is a schematic illustration of an inventive composite consisting of solid-electrolyte membrane, catalytic layer and gas diffusion layer joined thereto in a side view.

By repeating the copying procedure illustrated in FIGS. 1 to 5 several times, several catalytic layers 50a, 50b can, as illustrated in FIG. 8, be applied one on top of the other, this application on top of one another of the catalytic layers 50, 50a, 50b offering the possibility of having the solid-electrolyte particles 42 start to melt or melt to varying degrees in each of the catalytic layers 50, 50a, 50b and/or of varying the composition of the catalytic layer.

For example, the solid-electrolyte particles 42 are caused to melt or start to melt to a greater extent in the catalytic layer 50 located directly on the surface 30 than in the subsequent catalytic layers 50a and 50b. The degree of melting of the solid-electrolyte particles 42 preferably decreases successively in the consecutive catalytic layers 50, 50a, 50b.

In order to produce a composite consisting of an electrode formed from the catalytic layer or the catalytic layers and the solid-electrolyte membrane 34 which is ready for installation, a gas diffusion layer 52 allowing a diffusion of gas is applied to the catalytic layer 50 or to the uppermost catalytic layer 50b already applied. This gas diffusion layer 52 corresponds in size and shape to the catalytic layer 50 or 50b and engages over this essentially completely. For example, the gas diffusion layer consists of hydrophobized carbon paper or carbon fiber, the connection between the material of the gas diffusion layer 52 and the uppermost catalytic layer 50 or 50b being provided merely by the mechanical pressure exerted when this gas diffusion layer is pressed onto the uppermost catalytic layer 50 or 50b, for example, when passing through a pressing device with a pair of rollers.

Figure 10:
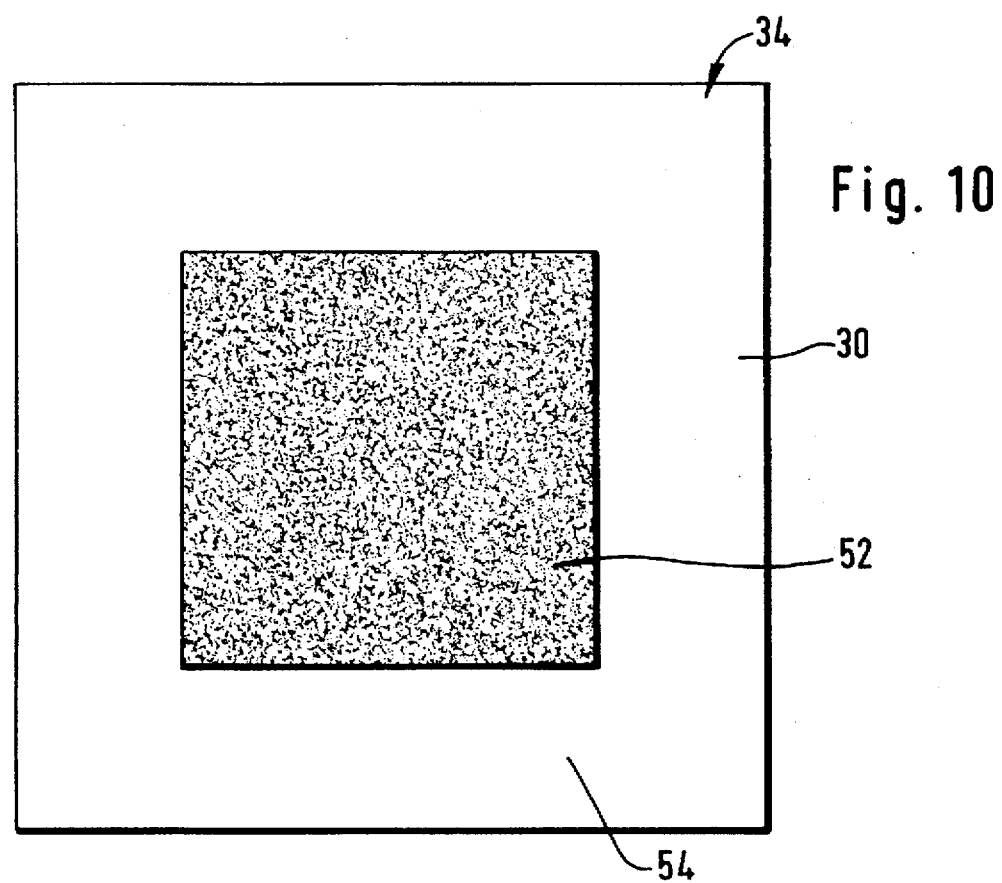
FIG. 10 is a plan view of the composite according to FIG. 9 in the direction of arrow B and FIG. 11 is a section through a fuel cell with an inventive composite consisting of solid-electrolyte membrane, catalytic layer and gas diffusion layer.

As illustrated in FIG. 10, a composite consisting of the membrane 34 and an electrically conductive gas diffusion layer 52 as well as a catalytic layer 50 located therebetween and forming the electrode can be produced in this way, the membrane 34 extending laterally beyond the electrode 50 and the gas diffusion layer 52 and having free edge regions 54 around the electrode layer 52 in order to facilitate a direct sealing on the surfaces 30 and 32 of the membrane 34 in this edge region.

Figure 11:
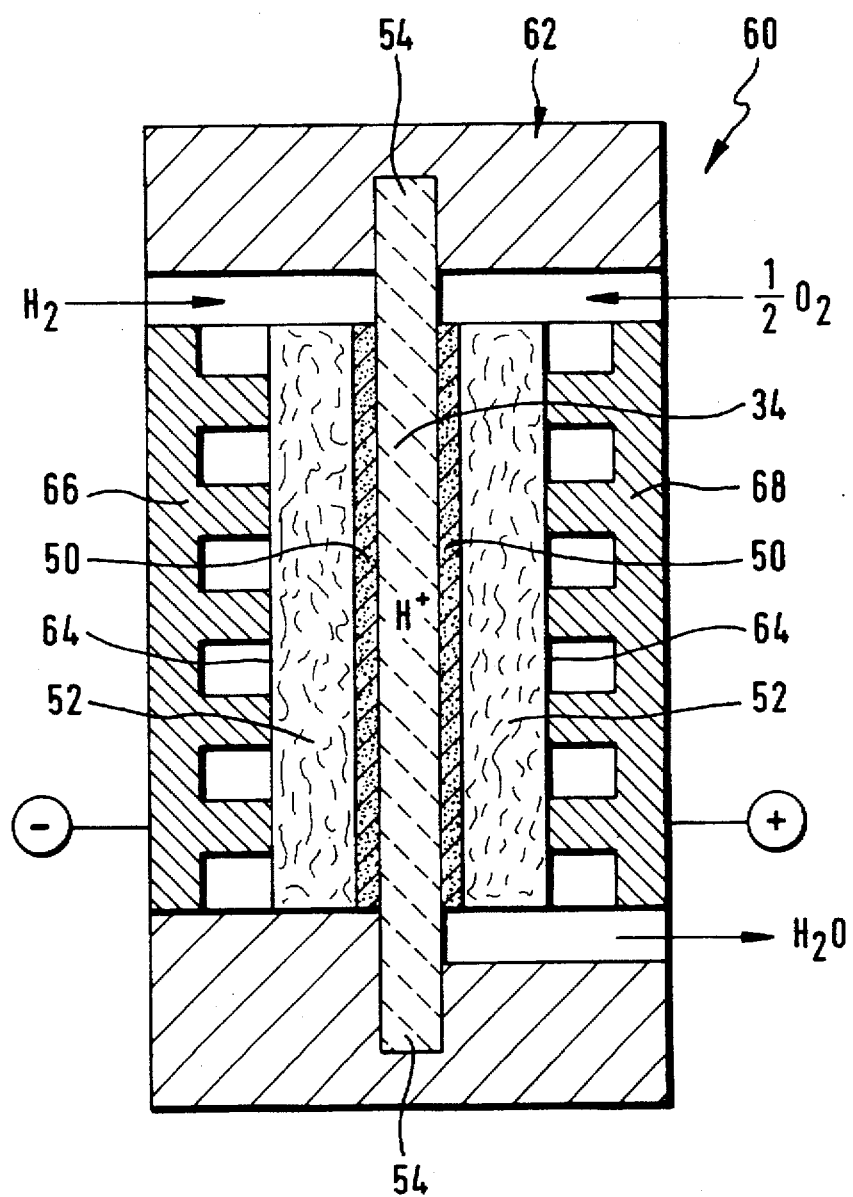

An inventive fuel cell 60, illustrated in FIG. 11, comprises the membrane 34 with the catalytic layers 50 applied to both sides of the membrane and the gas diffusion layer 52 engaging over them. The membrane 34 is held sealingly in a housing 62 of the fuel cell 60 in the region of the free edge regions 54 and the electrically conductive gas diffusion layers 52 are contacted on their sides 64 facing away from the membrane 34 by current collectors 66, 68 which are respectively located on the gas diffusion layers 52, the gas diffusion layers 52 uniformly distributing the bearing pressure of the current collectors 66, 68 onto the electrodes formed from the catalytic layers 50. Furthermore, the gas diffusion layers 52 allow the diffusion of $H_2$ and $O_2$ to the electrodes 50 and to the membrane 34.

The present disclosure relates to the subject matter disclosed in German application No. P 195 09 748.3 of Mar. 17, 1995, the entire specification of which is incorporated herein by reference.

I claim:

1. A process for the production of a composite comprising an electrode material, catalyst material and a solid-electrolyte membrane for an electrochemical cell, comprising the steps of:

produced a catalytic powder comprising electrode material, catalyst material and solid-electrolyte material;

releasably depositing the catalytic powder on an intermediate carrier surface area to form a layer thereon;

heating the layer of catalytic powder on a side of said layer which faces away from the intermediate carrier surface area in order to soften the solid-electrolyte material;

subsequently transferring at least a portion of the softened solid-electrolyte material to remove it from the intermediate carrier and apply it to the solid-electrolyte membrane under pressure and while the solid-electrolyte material is still softened in order to form said composite;

wherein said softened solid-electrolyte material is brought into pore-deep contact with the electrode material and the catalyst material.

2. A process as defined in claim 1, wherein the catalytic powder is heated by electromagnetic radiation.

3. A process as defined in claim 2, wherein the electromagnetic radiation is infrared radiation.

4. A process as defined in claim 1, wherein the solid-electrolyte material of the solid-electrolyte membrane is heated prior to the application of the catalytic powder.

5. A process as defined in claim 1, wherein said process is carried out exclusively free of solvents with respect to the supply of solid-electrolyte material.

6. A process as defined in claim 1, wherein the catalytic powder is applied to the solid-electrolyte membrane in a limited surface region to provide a free-edge region of said membrane.

7. A process as defined in claim 1, wherein the catalytic powder is fixed on said carrier surface area by electrostatically charging this surface area.

8. A process as defined in claim 1, wherein an electrically conductive catalytic layer is produced from the catalytic powder by means of mechanical compacting.

9. A process as defined in claim 1, wherein the catalytic layer is applied to the solid-electrolyte membrane from the catalytic powder in a continuous operation.

10. A process as defined in claim 1, wherein several catalytic layers are applied to the solid-electrolyte membrane from the catalytic powder one on top of the other.

11. A process as defined in claim 10, wherein the degree of softening of the solid-electrolyte material during the application of the individual catalytic layers is varied.

12. A process as defined in claim 1, wherein a diffusion layer is applied to the catalytic layer or the catalytic layers on their side facing away from the solid-electrolyte membrane.

13. A process as defined in claim 12, wherein said pressure is exclusively mechanical pressure.

14. A process as defined in claim 12, wherein the diffusion layer is selected from a material allowing an easy diffusion of the components of electrolysis.

15. A process as defined in claim 1, wherein both sides of the solid-electrolyte membrane are provided with said composite.

16. A process as defined in claim 1, wherein said electrochemical cell is a fuel cell.

17. A process as defined in claim 1 wherein said heating step is adjusted to adjust the melting depth of said layer of catalytic powder.

* * * * *